United States Patent
Liao et al.

(10) Patent No.: US 11,802,202 B2
(45) Date of Patent: Oct. 31, 2023

(54) MODIFIED THERMOPLASTIC POLYESTER ELASTOMER

(71) Applicant: NAN YA PLASTICS CORPORATION, Taipei (TW)

(72) Inventors: Te-Chao Liao, Taipei (TW); Ching-Yao Yuan, Taipei (TW); Wei-Tang Liao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 126 days.

(21) Appl. No.: 17/337,430

(22) Filed: Jun. 3, 2021

(65) Prior Publication Data
US 2022/0064435 A1 Mar. 3, 2022

(30) Foreign Application Priority Data
Aug. 31, 2020 (TW) .................................. 109129683

(51) Int. Cl.
*C08L 67/02* (2006.01)
*C08G 63/672* (2006.01)
*C08K 5/105* (2006.01)
*C08K 5/132* (2006.01)
*C08K 5/12* (2006.01)
*C08K 5/00* (2006.01)
*C08G 63/91* (2006.01)
*C08K 5/1515* (2006.01)

(52) U.S. Cl.
CPC .......... *C08L 67/025* (2013.01); *C08G 63/672* (2013.01); *C08G 63/916* (2013.01); *C08K 5/005* (2013.01); *C08K 5/105* (2013.01); *C08K 5/12* (2013.01); *C08K 5/132* (2013.01); *C08K 5/1515* (2013.01); *C08L 2205/025* (2013.01); *C08L 2205/08* (2013.01); *C08L 2207/04* (2013.01); *C08L 2207/20* (2013.01)

(58) Field of Classification Search
CPC .... C08L 67/025; C08L 63/672; C08L 63/916; C08L 2205/025; C08L 2205/08; C08L 2207/04; C08L 2207/20
USPC ......................................................... 525/439
See application file for complete search history.

(56) References Cited

U.S. PATENT DOCUMENTS

| | | | |
|---|---|---|---|
| 2007/0052131 A1 | 3/2007 | Fujimaki et al. | |
| 2007/0225474 A1* | 9/2007 | Determan | C08J 11/24 528/272 |
| 2007/0275242 A1* | 11/2007 | Gopal | C08J 11/24 524/439 |
| 2008/0023887 A1* | 1/2008 | Vollenberg | C08J 11/24 525/54.31 |
| 2017/0355812 A1 | 12/2017 | Jung et al. | |

FOREIGN PATENT DOCUMENTS

| | | | |
|---|---|---|---|
| CN | 1079411 C | 2/2002 | |
| CN | 101248115 A | 8/2008 | |
| CN | 105001405 A | 10/2015 | |
| CN | 105860447 A | 8/2016 | |
| CN | 107109047 A | 8/2017 | |
| JP | 11323107 A | 11/1999 | |
| JP | 20032961 A | 1/2003 | |
| JP | 2003261755 A | 9/2003 | |
| JP | 2004189979 A | 7/2004 | |
| JP | 2004196967 A | 7/2004 | |
| JP | 200431929 A * | 8/2004 | ............. C08G 63/91 |
| JP | 2004250711 A | 9/2004 | |
| JP | 2006321908 A | 11/2006 | |
| JP | 201521078 A | 2/2015 | |
| WO | WO2005028188 A1 | 3/2005 | |

OTHER PUBLICATIONS

BASF; Irgafos 168 Product Data Sheet, 2010, p. 1-2.*

* cited by examiner

Primary Examiner — Kelechi C Egwim
(74) Attorney, Agent, or Firm — Li & Cai Intellectual Property Office

(57) ABSTRACT

A modified thermoplastic polyester elastomer and a breathable and waterproof membrane are provided. The modified thermoplastic polyester elastomer is formed from a thermoplastic polyester elastomer, a regenerated polyethylene terephthalate, and a compatibilizer. Based on a total weight of the modified thermoplastic polyester elastomer being 100 phr, a content of the regenerated polyethylene terephthalate is greater than 0 phr and up to 50 phr. Based on a total weight of the thermoplastic polyester elastomer being 100 wt %, the thermoplastic polyester elastomer includes 25 wt % to 75 wt % of hard segments and 25 wt % to 75 wt % of soft segments.

11 Claims, No Drawings

MODIFIED THERMOPLASTIC POLYESTER ELASTOMER

CROSS-REFERENCE TO RELATED PATENT APPLICATION

This application claims the benefit of priority to Taiwan Patent Application No. 109129683, filed on Aug. 31, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a modified thermoplastic polyester elastomer and a breathable and waterproof membrane, and more particularly to a modified thermoplastic polyester elastomer used as a material for a breathable and waterproof membrane, where the breathable and waterproof membrane that is made from the modified thermoplastic polyester elastomer has good moisture permeability.

BACKGROUND OF THE DISCLOSURE

A breathable and waterproof membrane is a membrane that is permeable to moisture but impermeable to liquid water. Moisture is water in a gaseous state and has small volume, and is thus capable of passing through the breathable and waterproof membrane from one side to another side by capillarity. Accordingly, the breathable and waterproof membrane is moisture-permeable. However, when moisture condenses into liquid water, molecules of the liquid water tend to aggregate into a molecular cluster under a coaction of surface tension and cohesive force. The molecular cluster has a large size, and cannot pass through the breathable and waterproof membrane from one side to another side, thereby enabling the breathable and waterproof membrane to be waterproof.

Most conventional breathable and waterproof membranes use polytetrafluoroethylene (PTFE) as the main material, so that a breathable and waterproof membrane having micropores can be produced. A mechanism of the breathable and waterproof membrane having the micropores to be moisture-permeable is to utilize a pressure difference of water vapor on both sides of the membrane, so as to drive the water vapor through the micropores and achieve the moisture-permeable effect. However, after a long period of use, the micropores of the breathable and waterproof membrane may be blocked, resulting in a decrease in the moisture permeability of the breathable and waterproof membrane. Moreover, the breathable and waterproof membrane made from polytetrafluoroethylene is not easily decomposed, thereby causing a negative impact on the environment.

According to the above, there is a decrease in the moisture-permeable effect of the conventional breathable and waterproof membranes over time, and the breathable and waterproof membrane is not easily decomposed. In order to overcome the above-mentioned issues, the present disclosure provides a modified thermoplastic polyester elastomer. By having good moisture permeability, the modified thermoplastic polyester elastomer of the present disclosure can be used to manufacture the breathable and waterproof membrane, and can be applied to functional apparel, e.g., medical isolation gowns and protective gowns, but the present disclosure is not limited thereto.

SUMMARY OF THE DISCLOSURE

In response to the above-referenced technical inadequacies, the present disclosure provides a modified thermoplastic polyester elastomer and a breathable and waterproof membrane that have good moisture permeability and use a high percentage of regenerated plastic, thereby achieving the effect of reusing recycled plastic.

In one aspect, the present disclosure provides a modified thermoplastic polyester elastomer that includes a thermoplastic polyester elastomer, a regenerated polyethylene terephthalate, and a compatibilizer. Based on a total weight of the modified thermoplastic polyester elastomer being 100 phr, a content of the regenerated polyethylene terephthalate is greater than 0 phr and up to 50 phr. Based on a total weight of the thermoplastic polyester elastomer being 100 wt %, the thermoplastic polyester elastomer includes 25 wt % to 75 wt % of hard segments and 25 wt % to 75 wt % of soft segments.

In certain embodiments, the hard segment is formed by an aromatic polyester and the soft segment is formed by an aliphatic polyester or an aliphatic polyether.

In certain embodiments, the aromatic polyester that forms the hard segment is selected from the group consisting of polybutylene terephthalate and polyethylene terephthalate.

In certain embodiments, the soft segment is formed by the aliphatic polyether, and the aliphatic polyether is selected from the group consisting of polytetramethylene ether glycol and polyethylene glycol.

In certain embodiments, the regenerated polyethylene terephthalate has an intrinsic viscosity from 0.7 to 0.75.

In certain embodiments, the compatibilizer is selected from the group consisting of: polycarboxylic acid hydrocarbons, aliphatic anhydrides, polyfunctional epoxides, and combinations thereof.

In certain embodiments, the compatibilizer is selected from the group consisting of: 2,2,4,4-diphenyltetracarboxylic acid, 3,3,4,4-benzophenone tetracarboxylic acid, pyromellitic acid dianhydride, cyclopentane tetracarboxylic acid, tetrahydrophthalic acid diglycidyl ester, glycerol diglycidyl ether, and combinations thereof.

In certain embodiments, the modified thermoplastic polyester elastomer further comprises an antioxidant, the oxidant being selected from the group consisting of: pentaerythritol tetrakis(3-(3,5-di-tert-butyl-4-hydroxyphenyl)propionate), tris(2,4-di-tert-butylphenyl) phosphite, octadecyl 3-(3,5-di-tert-butyl-4-hydroxyphenyl)propionate, and combinations thereof.

In certain embodiments, the modified thermoplastic polyester elastomer has a Shore hardness from 30D to 60D.

In another aspect, the present disclosure provides a breathable and waterproof membrane made from a modified thermoplastic polyester elastomer. The breathable and waterproof membrane has a moisture permeability of greater than or equal to 25000 $g/m^2 \cdot day$. The modified thermoplastic polyester elastomer is formed from a thermoplastic polyester elastomer, a regenerated polyethylene terephthalate, and a compatibilizer. Based on a total weight of the modified thermoplastic polyester elastomer being 100 phr, a content of the regenerated polyethylene terephthalate is greater than 0 phr and up to 50 phr. Based on a total weight of the thermoplastic polyester elastomer being 100 wt %, the thermoplastic polyester elastomer includes 25 wt % to 75 wt % of hard segments and 25 wt % to 75 wt % of soft segments.

In certain embodiments, the breathable and waterproof membrane has a thickness from 10 μm to 50 μm.

In certain embodiments, the breathable and waterproof membrane is non-microporous.

Therefore, in the modified thermoplastic polyester elastomer and the breathable and waterproof membrane provided by the present disclosure, by virtue of "the thermoplastic polyester elastomer including 25 wt % to 75 wt % of hard segments and 25 wt % to 75 wt % of soft segments" and "a content of the regenerated polyethylene terephthalate being greater than 0 phr and up to 50 phr", the breathable and waterproof membrane can be produced to have high moisture permeability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

There are no drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a modified thermoplastic polyester elastomer and a breathable and waterproof membrane made therefrom. The modified thermoplastic polyester elastomer of the present disclosure includes thermoplastic polyester elastomer (TPEE) and regenerated polyethylene terephthalate (PET). Therefore, the modified thermoplastic polyester elastomer of the present disclosure can include a high percentage of recycled plastics, so as to achieve recycling.

The thermoplastic polyester elastomer has good processing properties, and is suitable to be applied in manufacturing manners that include injection molding, blow molding, or extrusion molding. Furthermore, the thermoplastic polyester elastomer has the softness and elasticity of rubber and the rigidity and chemical stability of engineering plastics.

In the present disclosure, through choosing specific hard segments and soft segments, and adjusting and controlling a weight ratio of the hard segments and the soft segments, a thermoplastic polyester elastomer that has good moisture permeability and waterproofness can be polymerized. Even when the thermoplastic polyester elastomer of the present disclosure is further mixed with the regenerated polyethylene terephthalate that does not have moisture permeability and waterproofness, a certain degree of moisture permeability and waterproofness can still be retained. Therefore, the modified thermoplastic polyester elastomer of the present disclosure can be used to produce a breathable and waterproof membrane, and a content of the breathable and waterproof membrane includes a high percentage of recycled plastics, so as to achieve the effect of reusing recycled plastics. Practical embodiments are described as follows.

[Thermoplastic Polyester Elastomer]

The thermoplastic polyester elastomer of the present disclosure is a block copolymer including the hard segment and the soft segment in an alternating arrangement. Based on a total weight of the thermoplastic polyester elastomer being 100 wt %, the thermoplastic polyester elastomer includes 25 wt % to 75 wt % of hard segments and 25 wt % to 75 wt % of soft segments. Preferably, the thermoplastic polyester elastomer includes 30 wt % to 70 wt % of hard segments and 30 wt % to 70 wt % of soft segments.

In a preferred embodiment, a content of the soft segment is higher than a content of the hard segment. That is, the thermoplastic polyester elastomer includes 25 wt % to less than 50 wt % of hard segments and 50 wt % to 75 wt % of soft segments. More preferably, the content of the soft segment is higher than the content of the hard segment, and the thermoplastic polyester elastomer includes 30 wt % to less than 50 wt % of hard segments and 50 wt % to 70 wt % of soft segments. In this way, the thermoplastic polyester elastomer can have better moisture permeability.

The hard segments of the thermoplastic polyester elastomer are formed by aromatic polyester, and the aromatic polyester is formed from aromatic dicarboxylic acid and aliphatic diol, or from aromatic dicarboxylic acid and alicyclic diol through a copolycondensation reaction. The aromatic dicarboxylic acid may be, but not limited to: benzenedicarboxylic acid, biphenyl dicarboxylic acid, or naphthalene dicarboxylic acid; the aliphatic diol may be, but not limited to: ethanediol, propanediol, butanediol, or hexanediol; and the alicyclic diol may be, but not limited to: cyclohexanediol. Specifically speaking, the hard segments have a number average molecular weight from 30000 to 80000.

In a preferred embodiment, the aromatic polyester that forms the hard segments is selected from the group consisting of: polyethylene terephthalate and polybutylene terephthalate (PBT), but is not limited thereto.

The soft segments of the thermoplastic polyester elastomer are formed by aliphatic polyester or aliphatic polyether, and the aliphatic polyester is formed from aliphatic dicarboxylic acid and aliphatic diol, or from aliphatic dicarboxylic acid and alicyclic diol through a copolycondensation reaction. The aliphatic polyether is formed through a copolycondensation reaction of aliphatic diol or through a ring-opening polymerization of epoxide and aliphatic diol. The aliphatic dicarboxylic acid may be, but not limited to: propionic acid, caproic acid, heptanoic acid, octanoic acid or lauric acid; the aliphatic diol may be, but not limited to: ethanediol, propanediol, butanediol, or hexanediol; the alicyclic diol may be, but not limited to: cyclohexanediol; and the epoxide may be, but not limited to: ethylene oxide, propylene oxide or tetrahydrofuran. Specifically speaking, the soft segments have a number average molecular weight from 30000 to 80000.

In a preferred embodiment, the soft segments are formed by the aliphatic polyether, and the aliphatic polyether is selected from the group consisting of: polyethylene glycol (PEG) and polytetramethylene ether glycol (PTMEG), but is not limited thereto.

When synthesizing the thermoplastic polyester elastomer, a precursor resin composition including the aforementioned soft segments can be polymerized first, i.e., first mixing aliphatic dicarboxylic acid and aliphatic diol, or mixing aliphatic dicarboxylic acid and alicyclic diol for a condensation reaction, or first mixing epoxide and aliphatic diol for a ring-opening polymerization reaction. Then, monomers (e.g., aromatic dicarboxylic acid and aliphatic diol or alicyclic diol) required for synthesizing the aforementioned hard segments are put into the precursor resin composition, and the thermoplastic polyester elastomer of the present disclosure is completed after the polymerization reaction. The above steps for manufacturing the thermoplastic polyester elastomer are for illustrative purposes only, and are not intended to limit the scope of the present disclosure.

[Modified Thermoplastic Polyester Elastomer]

The modified thermoplastic polyester elastomer of the present disclosure is formed by mixing the aforementioned thermoplastic polyester elastomer, the regenerated polyethylene terephthalate, a compatibilizer, and an antioxidant in a melted state. Based on a total weight of the modified thermoplastic polyester elastomer being 100 phr, a content of the regenerated polyethylene terephthalate is greater than 0 phr and up to 50 phr, a content of the compatibilizer is 0.1 phr to 3 phr, and a content of the antioxidant is 0.2 phr to 3 phr.

The source of the regenerated polyethylene terephthalate may be regenerated polyethylene terephthalate bottle chips. After being recycled, processed, and regenerated, the regenerated polyethylene terephthalate bottle chips can be made into the regenerated polyethylene terephthalate. In this embodiment, the regenerated polyethylene terephthalate has an intrinsic viscosity from 0.7 to 0.75, and a number average molecular weight from 40000 to 60000.

By adding the compatibilizer, compatibility between the thermoplastic polyester elastomer and the regenerated polyethylene terephthalate can be increased, so as to obtain the modified thermoplastic polyester elastomer that is uniform. In this embodiment, the compatibilizer is selected from the group consisting of: polycarboxylic acid hydrocarbons, aliphatic anhydrides, polyfunctional epoxides, and combinations thereof. For example, the compatibilizer is selected from the group consisting of: 2,2,4,4-diphenyltetracarboxylic acid, 3,3,4,4-benzophenone tetracarboxylic acid, pyromellitic acid dianhydride, cyclopentane tetracarboxylic acid, tetrahydrophthalic acid diglycidyl ester, glycerol diglycidyl ether, and combinations thereof.

By adding the antioxidant, under conditions where there is water vapor, ozone, or sunlight, the modified thermoplastic polyester elastomer can be prevented from chain scission and degradation due to reacting with free radicals. In this embodiment, the antioxidant can be selected from the group consisting of: pentaerythritol tetrakis(3-(3,5-di-tert-butyl-4-hydroxyphenyl)propionate), tris(2,4-di-tert-butylphenyl) phosphite, octadecyl 3-(3,5-di-tert-butyl-4-hydroxyphenyl) propionate, and combinations thereof.

Specifically, the modified thermoplastic polyester elastomer has a Shore hardness from 30D to 60D.

[Breathable and Waterproof Membrane]

The breathable and waterproof membrane of the present disclosure can be made by way of extruding or coating, but is not limited thereto. The material forming the breathable and waterproof membrane includes the aforementioned modified thermoplastic polyester elastomer. That is, the material forming the breathable and waterproof membrane includes the aforementioned thermoplastic polyester elastomer, the regenerated polyethylene terephthalate, and the compatibilizer, and content ratios thereof are substantially the same as those described in the previous embodiment and are not reiterated herein.

In this embodiment, the breathable and waterproof membrane is made by way of extrusion. The aforementioned thermoplastic polyester elastomer, the regenerated polyethylene terephthalate, the compatibilizer, and the antioxidant are put into a twin-screw extruder, and after processes of extruding and stretching, the breathable and waterproof membrane of the present disclosure is obtained. In the present disclosure, the breathable and waterproof membrane has a thickness from 10 μm to 50 μm.

In other embodiments, the breathable and waterproof membrane can be made by way of coating. The aforementioned thermoplastic polyester elastomer, the regenerated polyethylene terephthalate, the compatibilizer, and the antioxidant are melted into solution by using a solvent, and the solution is coated on a substrate for baking. After being peeled off from the substrate, the breathable and waterproof membrane of the present disclosure is obtained.

Furthermore, the breathable and waterproof membrane of the present disclosure is a non-porous hydrophilic membrane, that is, the breathable and waterproof membrane is non-microporous. Unlike a breathable and waterproof membrane that is microporous, a mechanism of the non-microporous breathable and waterproof membrane to be moisture-permeable is to utilize hydrophilic chains or hydrophilic groups in the material to absorb water. Then, the moisture is released after the water spreads to the other side of the breathable and waterproof membrane, thereby achieving the effect of water vapor (i.e., moisture) permeability. Since the breathable and waterproof membrane of the present disclosure is non-microporous, after a long period of use, there is no decrease in moisture permeability due to micropores being blocked.

To prove that the modified thermoplastic polyester elastomer of the present disclosure can be used to manufacture the breathable and waterproof membrane, breathable and waterproof membranes of Examples 1 to 3 (E1 to E3) and Comparative Example 1 (C1) that have a thickness of 15 μm are prepared in the present disclosure. The composition and content of the breathable and waterproof membrane are as listed in Table 1, and the moisture permeability is tested in compliance with JIS L1099 B1.

TABLE 1

| | Modified thermoplastic polyester elastomer (100 phr) | | | | Breathable and waterproof membrane Moisture permeability (g/m² · day) |
|---|---|---|---|---|---|
| | Hard segment | Soft segment | Hard segment:soft segment (weight ratio) | Regenerated PET (phr) | |
| E1 | PBT | PTMEG, PEG | 3:7 | 1 to 10 | 85000 to less than 130000 |
| E2 | PBT | PTMEG, PEG | 5:5 | 11 to 30 | 50000 to less than 85000 |
| E3 | PBT | PTMEG, PEG | 5:5 | 31 to 50 | 25000 to less than 50000 |
| C1 | PBT | PTMEG, PEG | 7:3 | 51 to 70 | 10000 to less than 25000 |

According to the results shown in Table 1, the breathable and waterproof membrane of the present disclosure has excellent moisture permeability. When a content of the regenerated polyethylene terephthalate in the modified thermoplastic polyester elastomer is not higher than 50 wt %, the moisture permeability of the breathable and waterproof membrane is greater than or equal to 25000 g/m²•day. Preferably, when the content of the regenerated polyethylene terephthalate in the modified thermoplastic polyester elastomer is not higher than 30 wt %, the moisture permeability of the breathable and waterproof membrane is greater than or equal to 50000 g/m2 day.

In the modified thermoplastic polyester elastomer, hydrophilic functional groups on molecular chains have a certain degree of hydrophilic ability. Therefore, when one side of the breathable and waterproof membrane has more moisture, the hydrophilic functional groups can absorb water vapor. Then, the water vapor can penetrate the breathable and waterproof membrane and be discharged through another side by way of diffusion, so that the breathable and waterproof membrane is moisture permeable.

[Beneficial Effects of the Embodiments]

In conclusion, in the modified thermoplastic polyester elastomer and the breathable and waterproof membrane provided by the present disclosure, by virtue of "the thermoplastic polyester elastomer including 25 wt % to 75 wt % of hard segments and 25 wt % to 75 wt % of soft segments", the breathable and waterproof membrane can be produced to have high moisture permeability.

Moreover, in the modified thermoplastic polyester elastomer and the breathable and waterproof membrane provided by the present disclosure, by virtue of "a content of the regenerated polyethylene terephthalate being greater than 0 phr and up to 50 phr", the effect of reusing recycled plastics can be achieved.

Furthermore, in the modified thermoplastic polyester elastomer and the breathable and waterproof membrane provided by the present disclosure, by virtue of "the compatibilizer being selected from the group consisting of: polycarboxylic acid hydrocarbons, aliphatic anhydrides, polyfunctional epoxides, and combinations thereof", the modified thermoplastic polyester elastomer and the regenerated polyethylene terephthalate can be uniformly mixed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A modified thermoplastic polyester elastomer comprising a thermoplastic polyester elastomer, a regenerated polyethylene terephthalate, and a compatibilizer, wherein, based on a total weight of the modified thermoplastic polyester elastomer being 100 phr, a content of the regenerated polyethylene terephthalate is greater than 0 phr and up to 50 phr; wherein, based on a total weight of the thermoplastic polyester elastomer being 100 wt %, the thermoplastic polyester elastomer includes 25 wt % to 75 wt % of hard segments and 25 wt % to 75 wt % of soft segments, and the hard segments have a number average molecular weight ranging from 30000 to 80000; wherein the compatibilizer is selected from the group consisting of: polycarboxylic acid hydrocarbons, aliphatic anhydrides, and combinations thereof.

2. The modified thermoplastic polyester elastomer according to claim 1, wherein the hard segment is formed by an aromatic polyester, and the soft segment is formed by an aliphatic polyester or an aliphatic polyether.

3. The modified thermoplastic polyester elastomer according to claim 2, wherein the aromatic polyester forming the hard segment is selected from the group consisting of polybutylene terephthalate and polyethylene terephthalate.

4. The modified thermoplastic polyester elastomer according to claim 2, wherein the soft segment is formed by the aliphatic polyether, and the aliphatic polyether is selected from the group consisting of polytetramethylene ether glycol and polyethylene glycol.

5. The modified thermoplastic polyester elastomer according to claim 1, wherein the regenerated polyethylene terephthalate has an intrinsic viscosity from 0.7 to 0.75.

6. The modified thermoplastic polyester elastomer according to claim 1, wherein the compatibilizer is selected from the group consisting of: 2,2,4,4-diphenyltetracarboxylic acid, 3,3,4,4-benzophenone tetracarboxylic acid, pyromellitic acid dianhydride, cyclopentane tetracarboxylic acid, and combinations thereof.

7. The modified thermoplastic polyester elastomer according to claim 1, wherein the modified thermoplastic polyester elastomer further comprises an antioxidant, the antioxidant being selected from the group consisting of: pentaerythritol tetrakis(3-(3,5-di-tert-butyl-4-hydroxyphenyl)propionate), tris(2,4-di-tert-butylphenyl) phosphite, octadecyl 3-(3,5-di-tert-butyl-4-hydroxyphenyl)propionate, and combinations thereof.

8. The modified thermoplastic polyester elastomer according to claim 1, wherein the modified thermoplastic polyester elastomer has a Shore hardness from 30D to 60D.

9. A breathable and waterproof membrane made from a modified thermoplastic polyester elastomer, wherein the breathable and waterproof membrane has a moisture permeability of greater than or equal to 25000 g/m²•day; wherein the modified thermoplastic polyester elastomer is formed from a thermoplastic polyester elastomer, a regenerated polyethylene terephthalate, and a compatibilizer; wherein, based on a total weight of the modified thermoplastic polyester elastomer being 100 phr, a content of the regenerated polyethylene terephthalate is greater than 0 phr and up to 50 phr; wherein, based on a total weight of the thermoplastic polyester elastomer being 100 wt %, the thermoplastic polyester elastomer includes 25 wt % to 75 wt % of hard segments and 25 wt % to 75 wt % of soft segments, and the hard segments have a number average molecular weight ranging from 30000 to 80000; wherein the compatibilizer is selected from the group consisting of: polycarboxylic acid hydrocarbons, aliphatic anhydrides, and combinations thereof.

10. The breathable and waterproof membrane according to claim 9, wherein the breathable and waterproof membrane has a thickness from 10 μm to 50 μm.

11. The breathable and waterproof membrane according to claim 9, wherein the breathable and waterproof membrane is non-microporous.

* * * * *